(12) United States Patent
Kima et al.

(10) Patent No.: US 6,688,412 B2
(45) Date of Patent: Feb. 10, 2004

(54) CONTROL DEVICE FOR IN-WHEEL TRANSMISSIONS IN AN ELECTRIC VEHICLE

(75) Inventors: Yasuo Kima, Tochigi-ken (JP); Tetsuro Hamada, Tochigi-Ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 109 days.

(21) Appl. No.: 09/939,737

(22) Filed: Aug. 28, 2001

(65) Prior Publication Data

US 2002/0023791 A1 Feb. 28, 2002

(30) Foreign Application Priority Data

Aug. 30, 2000 (JP) ........................ 2000/261278
Dec. 13, 2000 (JP) ........................ 2000/378561

(51) Int. Cl.$^7$ ................................ B60K 1/00
(52) U.S. Cl. ................ 180/65.5; 180/65.6; 180/65.1
(58) Field of Search ................ 180/65.5, 65.6, 180/65.1, 65.7, 65.8, 65.2, 220, 6.5, 242, 243; 701/22, 70; 477/15, 41, 3, 5; 310/67 R; 74/745; 475/5, 149; B60K 17/14

(56) References Cited

U.S. PATENT DOCUMENTS

| | | | | |
|---|---|---|---|---|
| 4,403,527 A | * | 9/1983 | Mohl et al. | 74/851 |
| 4,412,290 A | * | 10/1983 | Pannier | 364/424.1 |
| 4,733,743 A | * | 3/1988 | Weiss et al. | 180/255 |
| 5,067,932 A | * | 11/1991 | Edwards | 475/5 |
| 5,246,082 A | * | 9/1993 | Alber | 180/65.5 |
| 5,253,724 A | * | 10/1993 | Prior | 180/65.1 |
| 5,460,580 A | * | 10/1995 | Streib | 477/110 |
| 5,624,348 A | * | 4/1997 | Lardy et al. | 477/46 |
| 5,848,664 A | * | 12/1998 | Kaspar | 180/308 |
| 5,873,428 A | * | 2/1999 | Ohshita et al. | 180/224 |
| 5,884,201 A | * | 3/1999 | Kawai | 701/22 |
| 6,098,007 A | * | 8/2000 | Fritz | 701/93 |
| 6,165,104 A | * | 12/2000 | Streib | 477/174 |
| 6,276,474 B1 | * | 8/2001 | Ruppert et al. | 180/65.6 |
| 6,311,116 B1 | * | 10/2001 | Lee | 701/70 |
| 6,325,744 B1 | * | 12/2001 | Streib | 477/181 |
| 6,408,961 B1 | * | 6/2002 | Chen | 180/6.5 |

FOREIGN PATENT DOCUMENTS

JP 402180369 A * 7/1990 ............. 447/41

* cited by examiner

Primary Examiner—Brian L. Johnson
Assistant Examiner—G B Klebe
(74) Attorney, Agent, or Firm—Armstrong, Kratz, Quintos, Hanson & Brooks, LLP

(57) ABSTRACT

A control device for in-wheel transmissions in an electric vehicle, each of which comprises a stepped transmission that transmits power from each motor to each vehicle wheel. The control device is arranged to alleviate gear-change shock without increasing the number of steps of the in-wheel transmissions. Gear-change of the in-wheel transmissions of the vehicle wheels is effected with a time difference between the vehicle wheels. The change of acceleration produced by the gear change thereby occurs in such a manner that the change of acceleration is dispersed in regard to time, so the gear-change shock is alleviated compared with the case where gear-change of the four wheels is performed simultaneously.

3 Claims, 7 Drawing Sheets

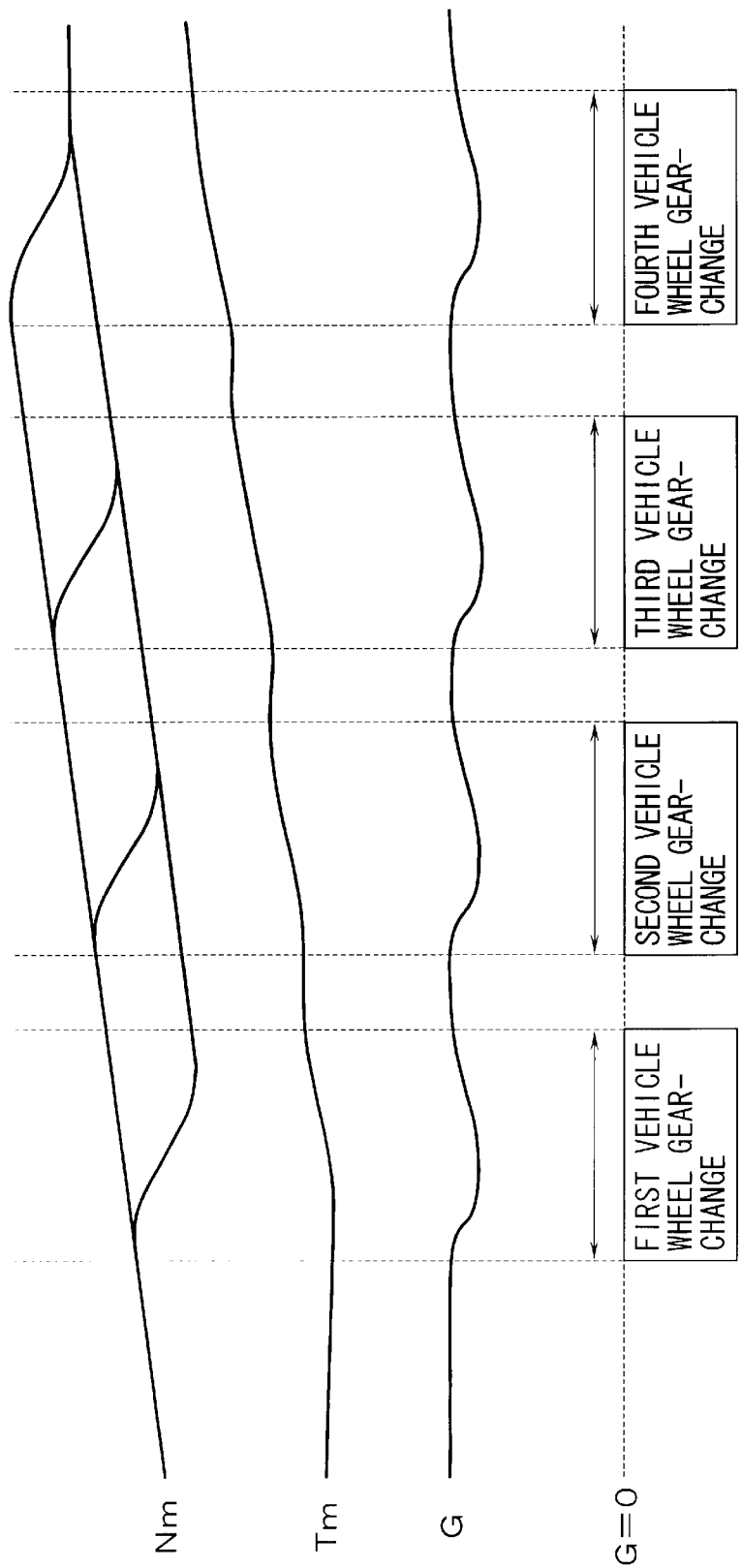

CONTROL DEVICE FOR IN-WHEEL TRANSMISSIONS IN AN ELECTRIC VEHICLE

BACKGROUND OF THE INVENTION

1. Field of the Invention

The present invention relates to a control device for in-wheel transmissions, each of which comprises a stepped transmission that transmits power from each electric motor to each drive wheel of an electric vehicle.

2. Description of the Related Art

Electric vehicles are previously known in which an electric motor is individually provided for each drive wheel, and the power from each electric motor is transmitted to each drive wheel through each of in-wheel transmissions comprising a continuously variable transmission (see Laid-open Japanese Patent Application No.H10-89439).

Also, because the cost of employing a continuously variable transmission is high, consideration has been given to constructing the in-wheel transmissions as stepped transmissions.

Because the speed range of an electric motor is wide, in the case where the in-wheel transmission is constructed of a stepped transmission, if the number of transmission steps is two, this is functionally sufficient, but, in this case, considerable shock is experienced on gear-change. A multi-stepped transmission, i.e., a three or four stepped transmission is therefore recommended, but this gives rise to problems regarding increased weight and size.

In view of this aspect, an object of the present invention is to provide a control device for an in-wheel transmissions such as to alleviate shock but without increasing the number of steps of an in-wheel transmission comprising a stepped transmission.

SUMMARY OF THE INVENTION

In order to attain the above object, according to the present invention, a control device for in-wheel transmissions ,each of which comprises a stepped transmission that transmits power from each electric motor to each drive wheel of an electric vehicle, comprises control means whereby gear-change of the in-wheel transmissions for the drive wheels is effected with a time difference at each drive wheel.

When gear-change of the in-wheel transmissions is effected, the vehicle acceleration changes with the change of torque produced by the torque characteristic of the electric motors, so, if gear-change of the in-wheel transmissions of all the drive wheels is effected simultaneously, the amount of change of acceleration of the vehicle as a whole is the total of the acceleration changes of all the drive wheels, and therefore a considerable shock is produced. However, according to the present invention, the change in acceleration of the drive wheels produced by the gear-changes of the in-wheel transmissions is dispersed in regard to time, so the shock is alleviated.

However, in a four-wheel drive electric vehicle in which all four front and rear and left and right vehicle wheels are drive wheels, if gear-change is effected with a time difference with respect to all of the in-wheel transmissions for the four vehicle wheels, the resultant of the drive force of the vehicle wheel that is being subjected to gear-change and the drive force of the other vehicle wheel on the same side, left or right, falls below the total drive force of the two vehicle wheels on the opposite left/right side due to the drop in the drive force of the vehicle wheel that is being subjected to gear-change. This causes a yaw moment to act on the vehicle. In this case, if the output of the electric motor for the other vehicle wheel on the same side, left or right, as the vehicle wheel that is being subjected to gear-change is increased when gear-change of each of the in-wheel transmissions of the vehicle wheels is being conducted, the drop in the drive force of the vehicle wheel that is being subjected to gear-change is canceled by the increase in the drive force of the other vehicle wheel on the same side, so action of a yaw moment can be prevented.

Also, in the case of a four-wheel drive electric vehicle, even if gear-change of the in-wheel transmissions is conducted simultaneously for two vehicle wheels in each case, with a time difference, shock is alleviated compared with the case where gear-change is conducted simultaneously for the four wheels. Thus, if gear-change of the in-wheel transmissions is conducted simultaneously for one vehicle wheel on each of the left and right sides, making a total of two vehicle wheels, and gear-change of the in-wheel transmissions is conducted simultaneously for the remaining two vehicle wheels with a time difference thereafter, the yaw moment can be prevented.

BRIEF DESCRIPTION OF THE DRAWINGS

FIG. 4 is a time chart illustrating the change of motor speed, motor torque and acceleration when gear-change is effected with an in-wheel transmission using a device according to the present invention;

DESCRIPTION OF THE PREFERRED EMBODIMENTS

Figure 1:
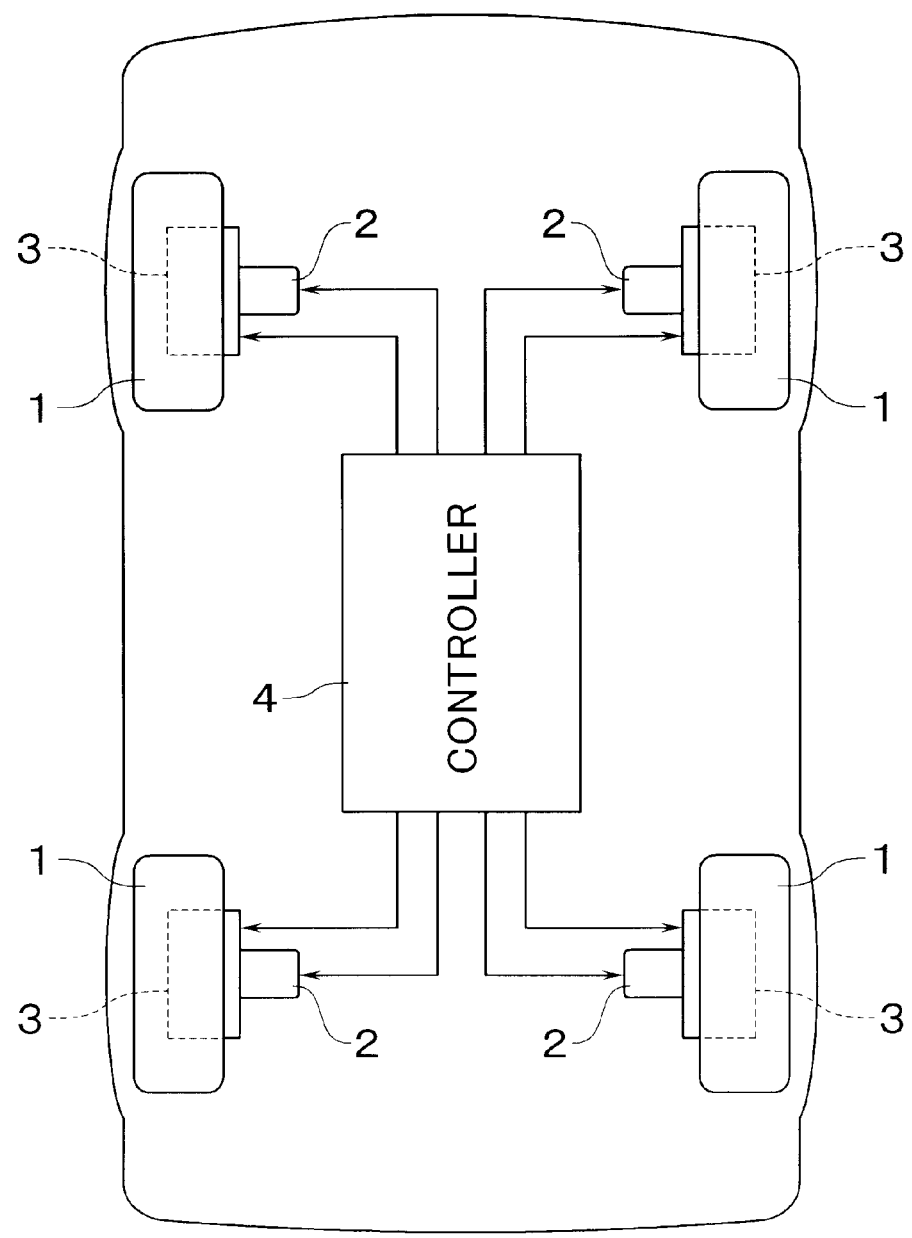
FIG. 1 is a diagrammatic plan view illustrating an electric vehicle in which a device according to the present invention is employed.

FIG. 1 illustrates a four-wheel drive electric vehicle in which all four vehicle wheels 1 at the front and rear and the left and right are drive wheels. This arrangement is such that individual electric motors 2 are provided for each vehicle wheel 1, and each vehicle wheel 1 is driven by each electric motor 2 through an in-wheel transmission 3 incorporated in each vehicle wheel 1. The electric motor 2 and the in-wheel transmission 3 for each vehicle wheel 1 are controlled by a controller 4 comprising an on-board computer.

Figure 2:
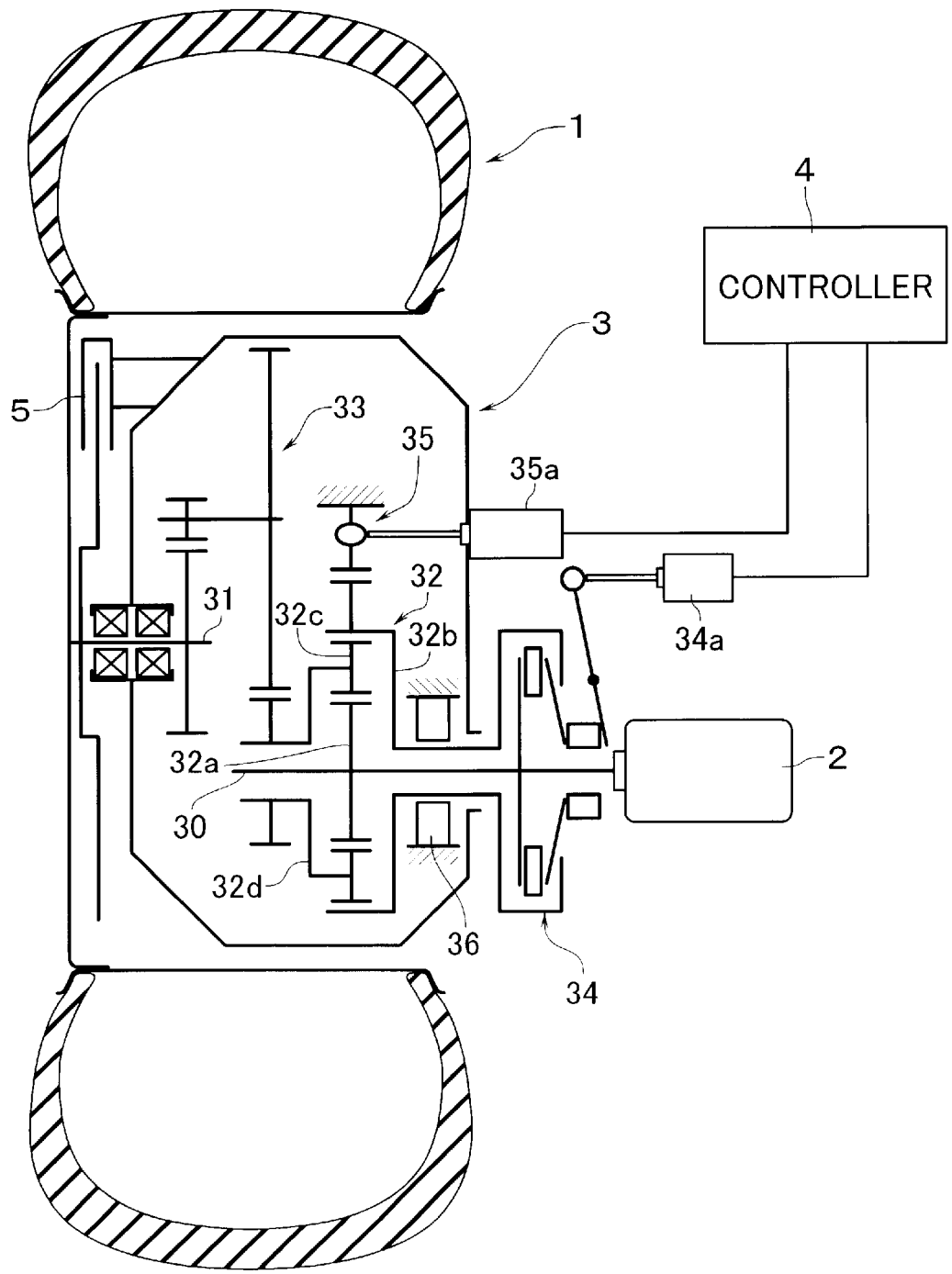
FIG. 2 is a skeleton view showing an in-wheel transmission.

The in-wheel transmission 3 is constituted by a stepped transmission that performs two-step, i.e., high and low gear-change. As shown in detail in FIG. 2, a planetary gear mechanism 32 and a reducing gear train 33 are interposed in series between an input shaft 30 linked with the electric motor 2 and an output shaft 31 linked with the vehicle wheel 1. The planetary gear mechanism 32 comprises a sun gear 32a, a ring gear 32b, planet gears 32c that mesh with the sun gear 32a and the ring gear 32b and a carrier 32d that carries the planet gears 32c; the sun gear 32a is linked with the input shaft 30 and the carrier 32d is linked with the output shaft 31 through a reducing gear train 33. Also, there are provided a clutch 34 that links the ring gear 32b with the input shaft 30, an LR brake 35 that brakes the ring gear 32b, and a one-way clutch 36 that prevents reverse rotation of the ring gear 32b. Thus, if the clutch 34 is engaged, the carrier 32d is put into the condition in which it rotates with the same speed as the input shaft 30, i.e., high gear ratio is established. If the LR brake 35 is engaged, the carrier 32d is put in to the condition in which it rotates with reduced speed relative to input shaft 30, i.e., low gear ratio is established. During reverse drive, the electric motor 1 is rotated in reverse with the LR brake 35 engaged. The clutch 34 and the LR brake 35 are respectively engaged/disengaged by actuators 34a, 35a controlled by the controller 4, so that the clutch 34 and the LR brake 35 are engaged/disengaged under the control of controller 4 in response to the running condition of the vehicle, to effect automatic gear-change with two gear ratios, i.e., high and low. Numeral 5 in the drawings denotes a vehicle wheel brake.

Figure 3:
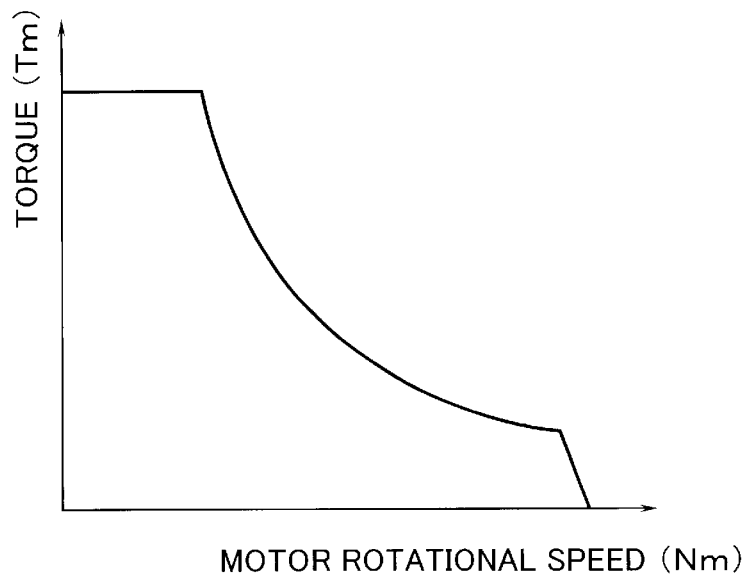
FIG. 3 is a graph showing the output characteristic of an electric motor.
Figure 9:
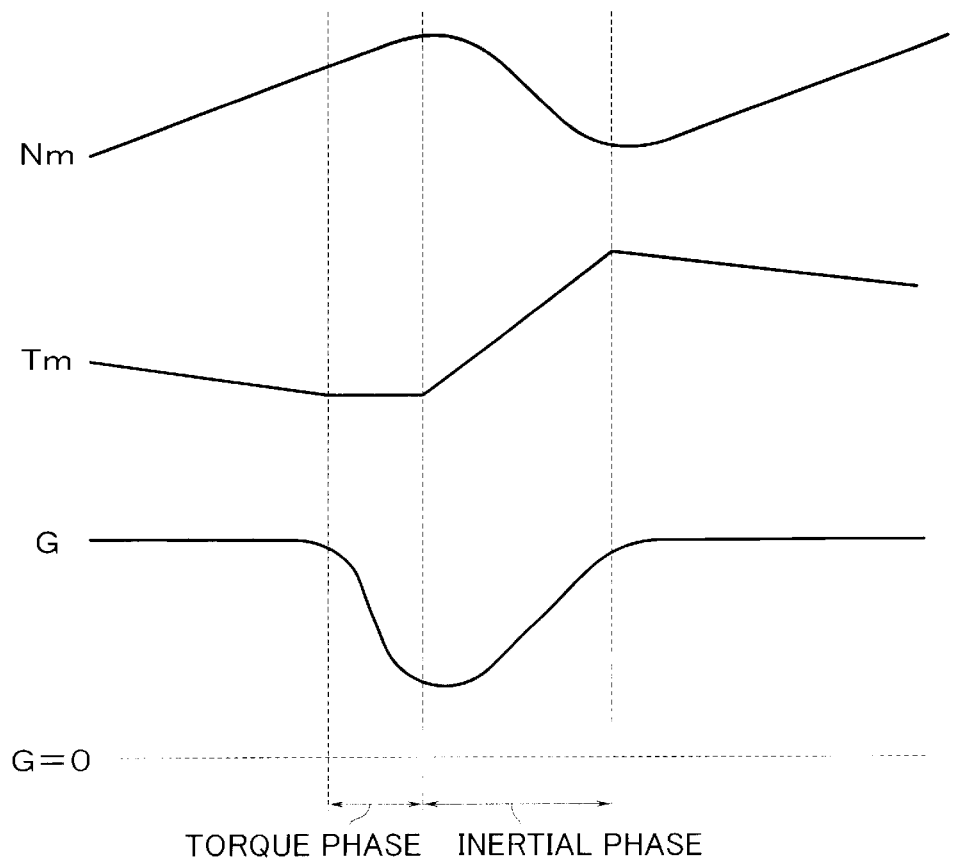
FIG. 9 is a time chart illustrating the change of motor speed, motor torque and acceleration when gear-change of the in-wheel transmissions is performed simultaneously for all four wheels.

The rated torque of the electric motor 2 changes as shown in FIG. 3 in response to the rotational speed Nm of the electric motor. The vehicle acceleration is decreased in the torque phase of the initial period of gear-change when gear-change takes place from low gear ratio to high gear ratio of the in-wheel transmission 3, and the vehicle wheel acceleration is increased by increase in the motor torque on decrease of motor rotational speed Nm in the inertial phase. When gear-change of the in-wheel transmissions 3 for all the vehicle wheels 1 is effected simultaneously, as shown in FIG. 9, the acceleration changes of all the vehicle wheels 1 are superimposed, causing a considerable sinking feeling in regard to the acceleration G of the vehicle as a whole.

In contrast, in the present embodiment, as shown in FIG. 4, taking the four vehicle wheels 1 in order, it is arranged for gear-change from low gear ratio to high gear ratio of the in-wheel transmission 3 for each of the vehicle wheels 1 to be performed with a time difference by a control means constituted by controller 4 in the order: first vehicle wheel, second vehicle wheel, third vehicle wheel, fourth vehicle wheel. In this way, the change of acceleration of the vehicle wheels during gear-change occurs in a distributed fashion in regard to time, so the sinking feeling of acceleration G of the vehicle as whole is reduced to ¼ compared with the case where gear-change of the four wheels is effected simultaneously. Thus, gear-change shock is alleviated. Tm in FIG. 4 and FIG. 9 indicates the total torque of the electric motors 2 of the four vehicle wheels 1.

Also, in this embodiment, the ratio of the inertia of the ring gear 32b including the outer member of the clutch 34 and the inertia of the rotor of the electric motor 2 is set to be equal to the reciprocal of the ratio of the speed change of the ring gear 32b and the speed change of the rotor during gear-change. In this way, the energy generated during deceleration of the rotor during gear-change is completely consumed as energy for rotating the ring gear 32b, so inertial shock during gear-change is eliminated.

Figure 5:
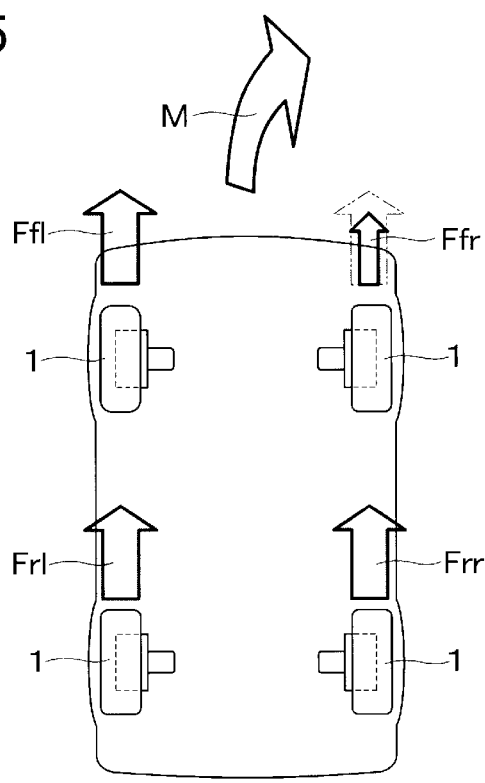
FIG. 5 is a view showing the drive force of each vehicle wheel during gear-change of an in-wheel transmission of the right front wheel.
Figure 6:
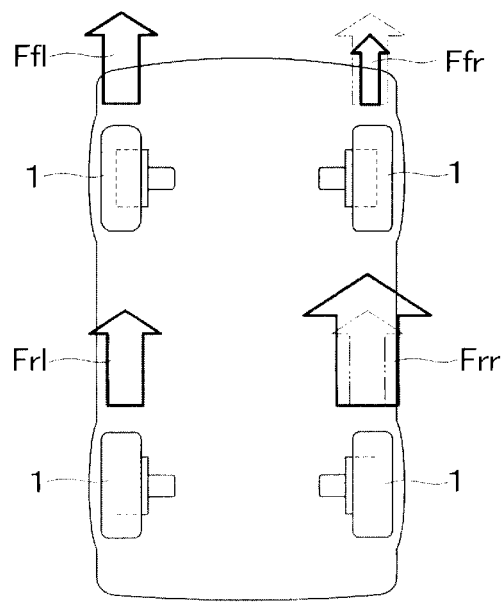
FIG. 6 is a view illustrating the drive force of each vehicle wheel when the output of the electric motor for the right rear wheel is increased on gear-change of the in-wheel transmission of the right front wheel.

By the way, the lowering of the drive forces of corresponding vehicle wheels 1 during gear-change of the in-wheel transmissions 3 causes a yaw moment. For example, as shown in FIG. 5, during gear-change of the in-wheel transmission 3 for the right front wheel, the propulsive force on the right-hand side of the vehicle, constituted by the resultant of the drive force Ffr of the right front wheel and the drive force Frr of the right rear wheel becomes lower than the propulsive force on the left-hand side of the vehicle constituted by the resultant of the drive Force Ffl of the left front wheel and the drive force Frl of the left rear wheel, due to a lowering of the drive force Ffr of the right front wheel during gear-change; a yaw moment M in the right-hand direction therefore acts, impairing the linearity of advance of the vehicle. Consequently, during gear-change of the in-wheel transmissions 3 of the vehicle wheels 1, it is desirable to exercise control whereby the output torque of electric motor 2 of the other vehicle wheel 1 which is on the same side, in terms of left and right, as the vehicle wheel 1 at which a gear-change is taking place is increased by using controller 4 to increase the current supplied to the drive motor 2 in question. In this way, for example, when a gear-change of the in-wheel transmission 3 for the right front wheel takes place, the torque of the electric motor for the right rear wheel is increased, thereby increasing the drive force Frr of the right rear wheel as shown in FIG. 6. By means of this increase, the drop of drive force Ffr of the right front wheel is canceled, thereby balancing the propulsive force on the right-hand side of the vehicle and the propulsive force on the left-hand side of the vehicle, so that a yaw moment no longer acts. Also, the inconvenience of a temporary reduction in the propulsive force of the vehicle as whole during gear-change does not occur. Although this means that, in the condition where the electric motor 2 is outputting the rated torque corresponding to the motor rotational speed at that time point, a current above the rated current will then be supplied to the electric motor 2 causing it to output a torque above the rated torque. The time for which such control is performed is short, so there is no adverse effect on the life of the electric motor 2.

Figure 7A:
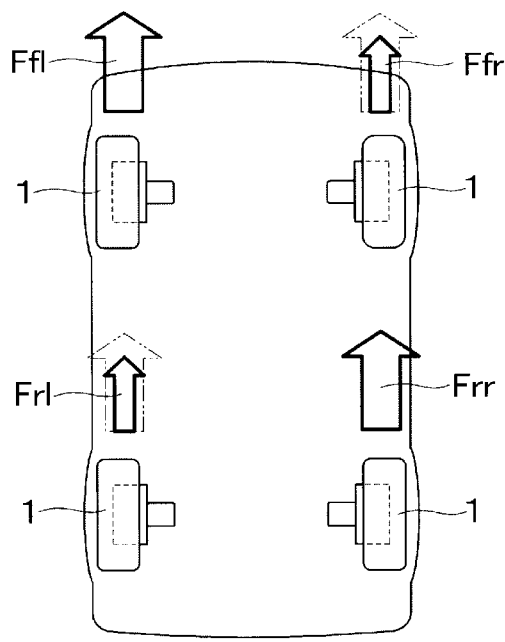
FIG. 7(A) is a view illustrating the drive force of each vehicle wheel during simultaneous gear-change of the in-wheel transmissions of the right front wheel and left rear wheel.
Figure 7B:
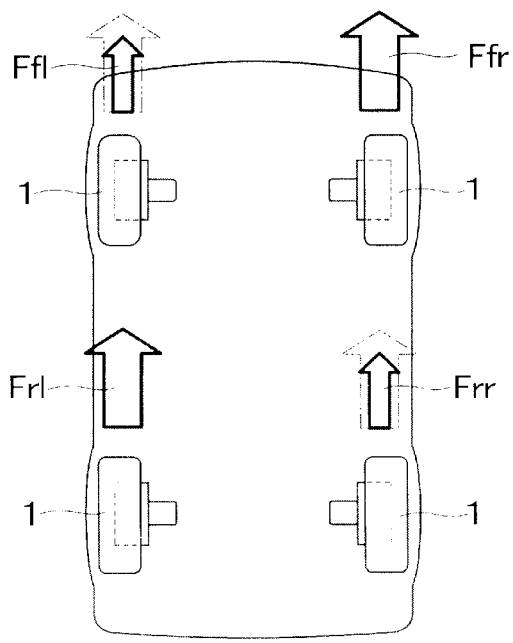
FIG. 7(B) is a view illustrating the drive force of each vehicle wheel during simultaneous gear-change of the in-wheel transmissions of the left front wheel and right rear wheel.

Although hereinabove an embodiment has been described in which gear-change of the in-wheel transmissions 3 is effected with a time difference in respect of all of the four wheels, it would also be possible to simultaneously conduct gear-change of the in-wheel transmissions 3 for one vehicle wheel on each of the left and right sides, making a total of two vehicle wheels, for example, the right front wheel and left rear wheel and then, with a time difference thereafter, to simultaneously conduct gear-change of the in-wheel transmissions 3 for the left front wheel and right rear wheel. FIG. 7(A) and FIG. 7(B) show the drive force of the vehicle wheels when this is done: both in the case of gear-change of the in-wheel transmissions 3 for the right front wheel and left rear wheel and in the case of subsequent gear-change of the in-wheel transmissions 3 for the left front wheel and right rear wheel, the propulsive force on the right hand side of the vehicle and the propulsive force on the left-hand side of the vehicle are maintained uniform, so no yaw moment acts.

Figure 8A:
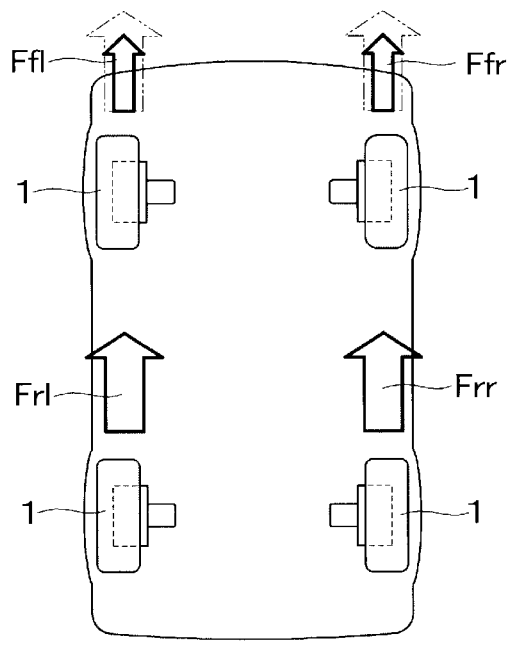
FIG. 8(A) is a view illustrating the drive force of each vehicle wheel during simultaneous gear-change of the in-wheel transmission of the left and right front wheels.
Figure 8B:
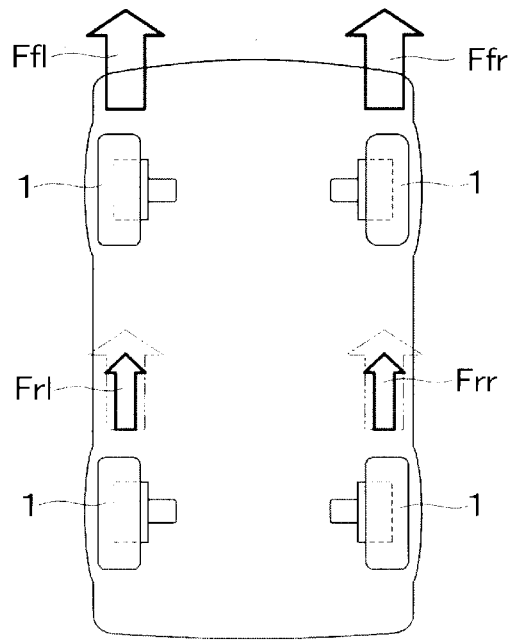
FIG. 8(B) is a view illustrating the drive force of each vehicle wheel during simultaneous gear-change of the in-wheel transmission of the left and right rear wheels.

It is also possible to simultaneously conduct gear-change of the in-wheel transmissions 3 for the right front wheel and left front wheel and subsequently with a time difference thereafter to simultaneously conduct gear-change of the in-wheel transmissions 3 for the right rear wheel and left rear wheel. In this case also, as shown in FIG. 8(A) and FIG. 8(B), the propulsive force on the right-hand side of the vehicle and the propulsive force on the left-hand side of the vehicle are maintained uniformly, so no yaw moment acts.

Although hereinabove a description has been provided for a four-wheel drive electric vehicle, even in the case of a two-wheel drive electric vehicle in which only the front wheels or only the rear wheels are drive wheels, gear-change shock can be alleviated by performing gear-change of the in-wheel transmissions of the two drive wheels with a time difference therebetween.

As described above, with the present invention, gear-change shock can be alleviated by keeping the change of acceleration of the vehicle as a whole produced by gear-change of the in-wheel transmissions small, so there is no need to increase the number of steps of the in-wheel transmissions in order to alleviate gear-change shock. This makes it possible to reduce the weight and size of the transmissions.

What is claimed is:

1. A control device for a plurality of in-wheel transmissions in an electric vehicle having a plurality of vehicle wheels, each one of the in-wheel transmissions including a stepped transmission that transmits power from an associated electric motor to an associated drive wheel of the electric vehicle, wherein said control device for in-wheel transmissions comprises control means for effecting gear-change of the in-wheel transmissions for the drive wheels at a different time for each drive wheel.

2. The control device for in-wheel transmissions in an electric vehicle according to claim 1, wherein all of the plurality of vehicle wheels, front and rear and left and right, are drive wheels, and said control means is constructed so that, in the event of gear-change of any of the in-wheel transmissions, said control means increases the output of an electric motor associated with another vehicle wheel on the same left or right side as the vehicle wheel which is being subjected to gear-change.

3. A control device for a plurality of in-wheel transmissions in an electric vehicle having four vehicle wheels, each one of the in-wheel transmissions including a stepped transmission that transmits power from an associated electric motor, respectively, to an associated one of the four vehicle wheels at the front and rear and left and right of the electric vehicle, wherein said control device for in-wheel transmissions comprises a control means that simultaneously effects gear-change of the in-wheel transmissions for one vehicle wheel on each of the left and right sides, making a total of first two vehicle wheels, and that simultaneously effects gear-change of the in-wheel transmissions for the remaining two vehicle wheels at a different time than for the first two vehicle wheels.

* * * * *